(12) United States Patent
Dronzek, Jr. et al.

(10) Patent No.: US 6,709,726 B1
(45) Date of Patent: Mar. 23, 2004

(54) PEELABLE LABEL

(75) Inventors: Peter J. Dronzek, Jr., Thornwood, NY (US); David P. Carnahan, Iron Mountain, MI (US); David F. Gagala, Iron Mountain, MI (US); Dennis T. Moore, Watertown, WI (US)

(73) Assignee: NorthStar Print Group, Norway, MI (US)

( * ) Notice: Subject to any disclaimer, the term of this patent is extended or adjusted under 35 U.S.C. 154(b) by 0 days.

(21) Appl. No.: 09/477,327

(22) Filed: Jan. 4, 2000

Related U.S. Application Data

(62) Division of application No. 08/955,385, filed on Oct. 21, 1997, now abandoned.

(51) Int. Cl.[7] .............................................. G09F 3/00
(52) U.S. Cl. .................... 428/40.1; 283/81; 428/41.5; 428/41.7; 428/42.1; 428/42.2; 428/42.3; 428/914
(58) Field of Search .................... 428/40.1, 41.5, 428/41.7, 42.1, 42.2, 42.3, 914; 283/81

(56) References Cited

U.S. PATENT DOCUMENTS

| | | |
|---|---|---|
| 581,494 A | 4/1897 | Schwab |
| 3,166,186 A | 1/1965 | Karn ............................ 206/56 |
| 3,212,913 A | 10/1965 | Mackenzie .................... 117/3.1 |
| 3,252,234 A | 5/1966 | Goodman ........................ 40/2 |
| 3,420,364 A | 1/1969 | Kennedy, Jr. ................. 206/214 |
| 3,568,398 A | 3/1971 | Allison et al. .................. 53/31 |
| 3,690,909 A | 9/1972 | Finley ............................ 117/6 |
| 3,914,483 A | 10/1975 | Stipek, Jr. ..................... 428/42 |
| 3,993,815 A | 11/1976 | Douek et al. .................. 428/40 |
| 4,060,168 A | 11/1977 | Romagnoli ................... 206/216 |
| 4,355,074 A | 10/1982 | Stemmler et al. ............ 428/350 |
| 4,398,985 A | 8/1983 | Eagon .......................... 156/233 |
| 4,479,838 A | 10/1984 | Dunsirn et al. .............. 156/247 |
| 4,526,405 A * | 7/1985 | Hattemer ...................... 283/81 |
| 4,544,590 A | 10/1985 | Egan ............................. 428/40 |
| 4,626,460 A | 12/1986 | Duncan ......................... 428/40 |
| 4,724,166 A | 2/1988 | deBruin .................... 427/208.8 |
| 4,833,122 A | 5/1989 | Doll et al. ................... 503/226 |
| 4,837,088 A * | 6/1989 | Freedman .................. 428/40.1 |
| 4,863,772 A | 9/1989 | Cross ........................... 428/40 |
| 4,888,075 A | 12/1989 | Freedman ................... 156/243 |
| 5,019,436 A | 5/1991 | Schramer et al. ............ 428/40 |
| 5,024,014 A | 6/1991 | Swierczek .................... 40/310 |
| 5,238,720 A | 8/1993 | Volkman ...................... 428/40 |
| 5,299,834 A * | 4/1994 | Kraige ........................ 283/81 |
| 5,328,538 A * | 7/1994 | Garrison ..................... 156/249 |
| 5,350,612 A | 9/1994 | Stern et al. ................... 428/40 |
| 5,358,281 A * | 10/1994 | Greig .......................... 428/42.1 |
| 5,413,384 A | 5/1995 | Principe et al. .............. 283/81 |
| 5,503,436 A * | 4/1996 | Alpaugh ....................... 283/81 |

FOREIGN PATENT DOCUMENTS

| | | | |
|---|---|---|---|
| JP | 3-152593 | * | 6/1991 |
| JP | 8-73828 | * | 3/1996 |

OTHER PUBLICATIONS

McGraw–Hill Encyclopedia of Electronics and Computers 2nd Edition, Sybil P. Parker/1988.

* cited by examiner

*Primary Examiner*—Nasser Ahmad
(74) *Attorney, Agent, or Firm*—Hedman & Costigan, P.C.

(57) ABSTRACT

A peelable or couponable label adapted to be releasably attached to a secondary or base label which is adhered to a labeled article.

14 Claims, 6 Drawing Sheets

PEELABLE LABEL

This is a divisional of Ser. No. 08/955,385, filed Oct. 21, 1997, now abandoned.

The subject invention relates to peelable labels and particularly to coupons adapted to be releasably attached to a secondary or base label which is adhered to a labeled article.

BACKGROUND OF THE INVENTION

Peelable couponable labels are well known in the art. Typically such labels employ a dry adhesive such as is described by Dunsirn et al. in U.S. Pat. No. 4,479,838 wherein a "dry residue" adhesive without a release layer is used which results in a tack free bond. However, the dry adhesive of these labels splits leaving adhesive on both label surfaces. Moreover, when a paper label substrate is used in the dry bond approach of the prior art, typically the bond of the dry bond adhesive becomes greater on aging than the strength of the paper fibers resulting in fiber tear on attempting to peel the label or coupon. This results unavoidably in the tearing of one or both of the paper labels if it is an all-paper construction or the transfer of indicia on the paper fiber from one surface to the other which removes required indicia from one face and adheres it unwanted to the other label face. In cases where the substrate is a polymer the problem of increase in bond strength with aging reduces the peelability of the label.

The release layer of the present invention solves the problems associated with the dry bond adhesive approach by utilizing a conventional release layer and pressure sensitive "tacky" adhesive which can be produced on conventional laminating equipment.

The present invention also solves the manufacturing problems associated with the prior art. Namely, costly special machinery is required to laminate two preprinted webs of paper or polymer in register to produce the types of couponable structures of the prior art. In the present invention, by printing label graphics in reverse (random or registered) on the back side of the face label directly on the release layer, the graphics will be transferred to the adhesive on the face of the base label. All of the graphics can be printed on the primary face web in one press pass using the front and back side of the primary web. The graphics printed in reverse on the release layer will adhere and transfer to the tacky adhesive when laminated. By using this technique with registered indica, any conventional adhesive laminator can use tacky adhesive to produce registered couponable labels without special equipment to register two printed webs of paper or polymer. In addition, since the ink is transferring to the surface of the tacky adhesive, there will not be tack in the inked areas since the tacky adhesive is masked by the ink.

OBJECTS OF THE INVENTION

It is therefore an object of the present invention to provide a peelable label wherein the base label with the adhered face label is applied to the article to be labeled with greater adhesion of the base sheet to the labeled article than adhesion of the face label to the base label so the top sheet can be removed from the base sheet with the base sheet remaining adhered to the labeled article.

It is another object of the invention to provide a peelable label wherein the use of the release coating facilitates the ease of removability (low bond strength) of the face label from the base label.

It is yet another object of the invention to provide a peelable label wherein the printed indicia of the primary and secondary labels are laminated in registry to produce a primary face label with printed indicia registered with the printed indicia of a secondary base label.

It is still another object of the invention to provide a peelable label wherein the indicia of the primary and secondary labels are printed in one printing pass in registry to produce a primary face label with printed indicia registered with the printed indicia of a secondary base label.

It is still another object of the invention to provide a cohesive transfer base to add integrity to the printed image which will mask the tack of the tacky adhesive in the areas applied.

It is still another object of the invention to provide a process for the manufacture of the peelable label of the present invention.

SUMMARY OF THE INVENTION

Accordingly, the present invention comprises a peelable label wherein a primary or face label with or without indicia on the reverse side is coated with a release layer and adhered or laminated with a clear or contact clear tacky adhesive to a secondary or base label. The secondary label can be printed randomly or registered with indicia on the front and/or back side. The primary and secondary substrates can be either paper, polymer or a combination of paper and polymer. In a preferred embodiment, the printed indicia of the primary and secondary labels are laminated in registry to produce a primary face label with printed indicia registered with the printed indicia of a secondary base label.

The back side of the secondary label is affixed to the object to be labeled through the use of adhesives. The base label with the adhered face label is applied to the article to be labeled with greater adhesion of the base sheet to the labeled article than adhesion of the face label to the base label so the top sheet can be removed from the base sheet with the base sheet remaining adhered to the labeled article. The use of the release coating facilitates the ease of removability (low bond strength) of the face label from the base label.

BRIEF DESCRIPTION OF THE DRAWINGS

Other objects and advantages of this invention may be seen from the following description when viewed in conjunction with the accompanying drawings wherein.

DESCRIPTION OF THE PREFERRED EMBODIMENT

Figure 1:
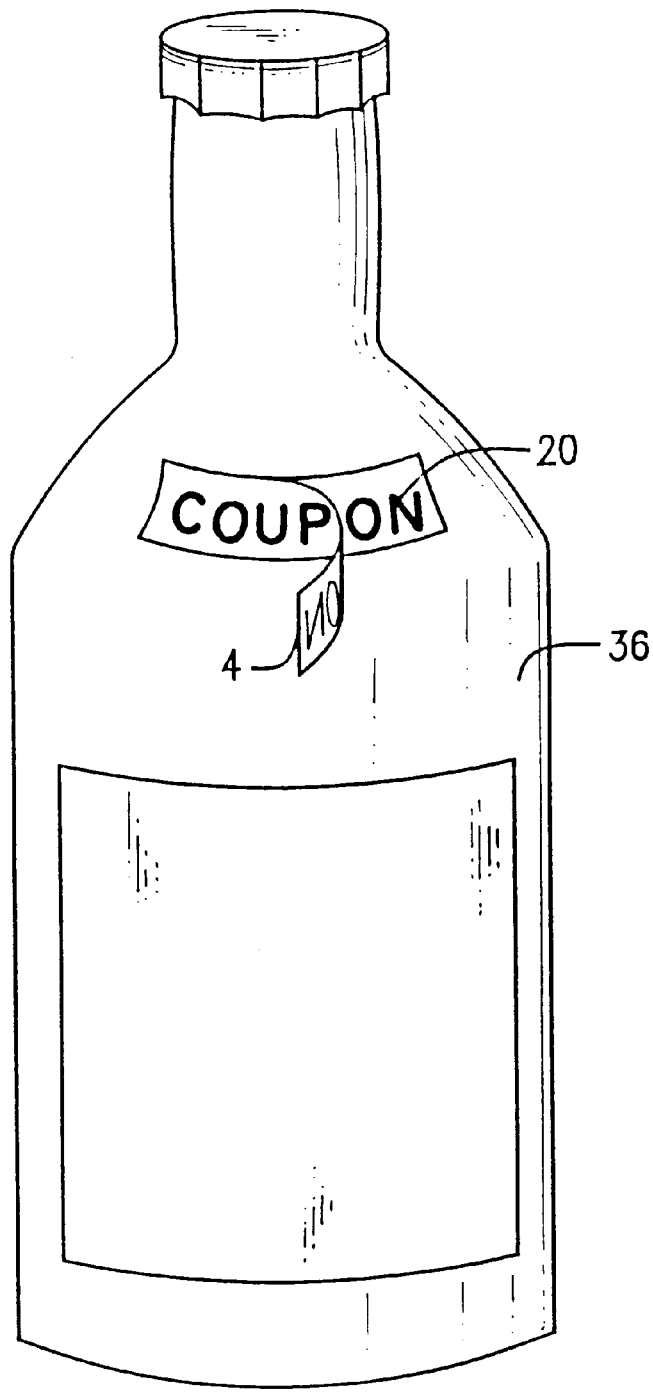
FIG. 1 is a perspective view of one embodiment of the peelable label mounted on a product container.
Figure 2:
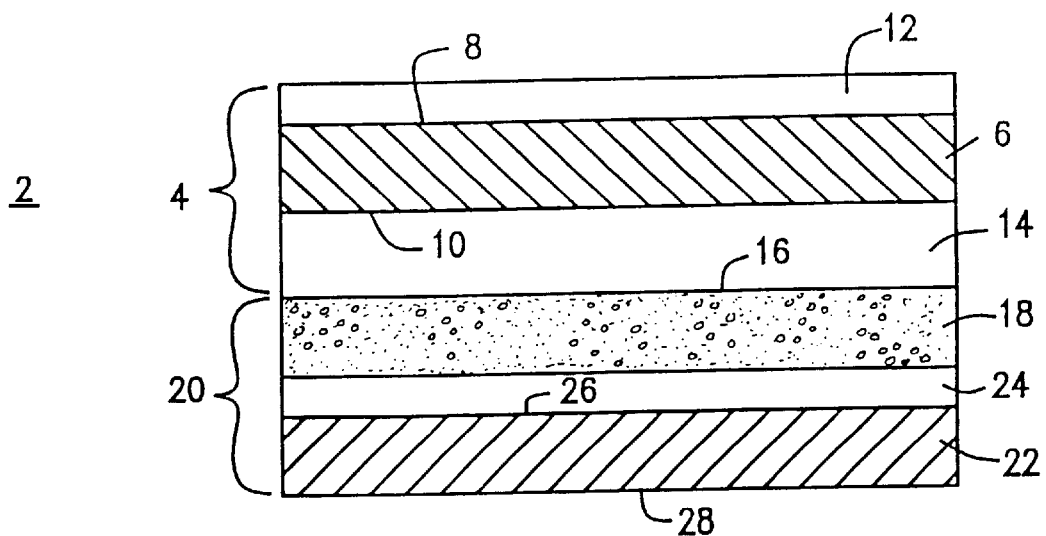
FIG. 2 is a sectional view of one embodiment of the peelable label.

As best seen in FIGS. 1 and 2 an embodiment of the peelable label 2 comprises a primary or face label 4 which comprises primary substrate 6 having a front side 8 and back side 10, indicia 12 disposed on the front side 8 of said primary substrate 6, and a release layer 14 disposed on said back side 10 of said primary substrate 6. Release layer 14 of said primary or face label 4 is adhered or laminated on its surface 16 with a clear or contact clear pressure sensitive tacky adhesive 18 to a secondary or base label 20. Release layer 14 is any release layer known in the art such as but not limited to silicone from General Electric or Dow Corning, UV-cured silicone from Rhone-Poulenc or Quillon release polymer from DuPont. An adhesive coating machine (not shown) which is well known in the art may be used to coat release layer surface 16. Such a machine may for example consist of a pair of rolls and a supply of pressure sensitive adhesive and a conventional dryer of known design to dry the adhesive to form a tacky pressure sensitive adhesive 18 on the surface 16.

In a preferred embodiment, the amount of tacky pressure sensitive adhesive 18 is minimized to the lowest coated weight possible to maintain adhesion (a function of the choice of the silicone and adhesive polymers) to aid in the production of the present invention, particularly the die cutting step, by minimizing the amount of tacky adhesive in contact with and available to stick to and gum up the cutting die. Additionally, crosslinking agents such as Poly Functional Aziridine can be added to a carboxylated acrylic pressure sensitive adhesive to crosslink with the adhesive and become harder and less tacky thereby reducing the tack level of the adhesive.

Printed indicia 12 can be printed on substrate 6 prior to lamination of release coating 14 to substrate 6 or may be printed after such lamination. Indicia 12 and 24 may comprise ink or any other suitable indicia known in the art such as but not limited to transfer foil.

The secondary label 20 comprises secondary substrate 22 and indicia 24. Indicia 24 can be printed randomly or, in a preferred embodiment, in registry with indicia disposed on the front side 26 and/or back side 28 of secondary substrate 22.

The primary and secondary substrates 6 and 22 can be either paper, polymer or a combination of paper and polymer. In a preferred embodiment, the printed indicia 12 of the primary label 4 and the printed indicia 24 of secondary label 20 are laminated in registry to produce a primary label 4 with printed indicia 12 registered with the printed indica 24 of secondary base label 20.

Figure 3:
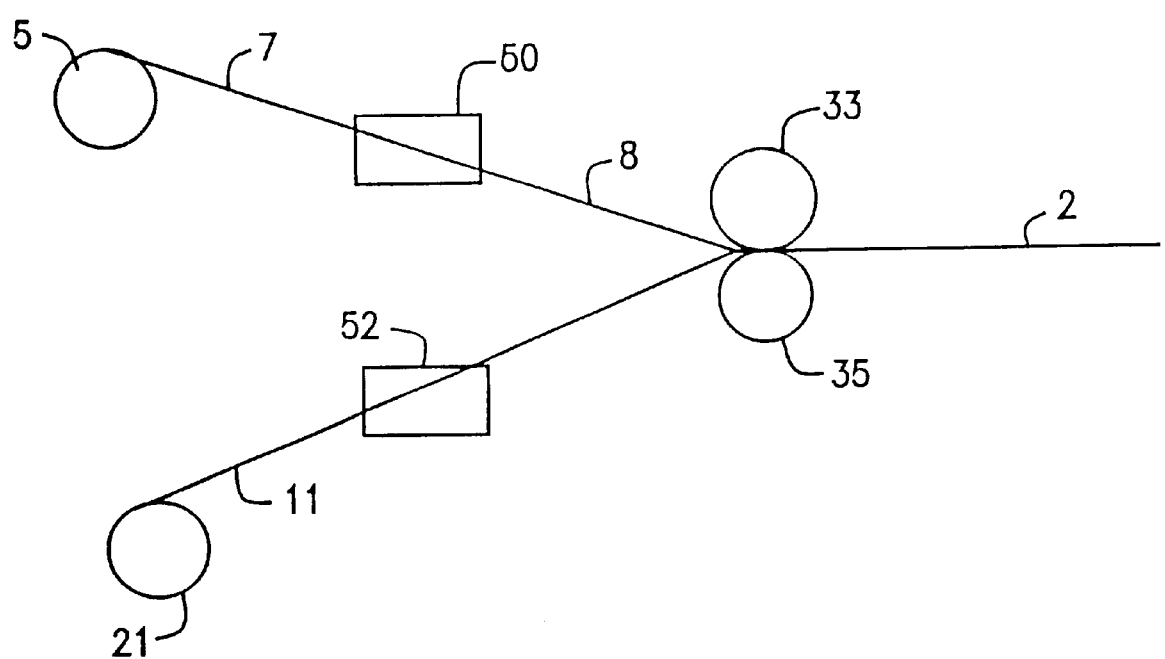
FIG. 3 is a diagrammatic view of one method of printing indicia in registry on said label.

Now referring to FIG. 3, primary label 4 can be laminated with secondary label 20 to ensure registry between printed indicia 12 and 24. Primary label 4 in the form of a web 7 is unwound from roll 5 and passed through a printing station 50 which prints indicia 12 on front side 8 of said primary substrate 6. Secondary label 20 in the form of a web 11 is unwound from a roll 21 and passed through a printing station 52 which prints indicia 24 on for example front side 26 of said secondary substrate 22. Alternatively, when secondary substrate 22 is clear or translucent indicia 24 can be printed on back side 28. Primary label 4 and secondary label 20 then pass simultaneously between a pair of pressure rolls 33 and 35 ensuring that the labels 4 and 20 are laminated together with indicia 12 and 24 in registry.

Figure 4:
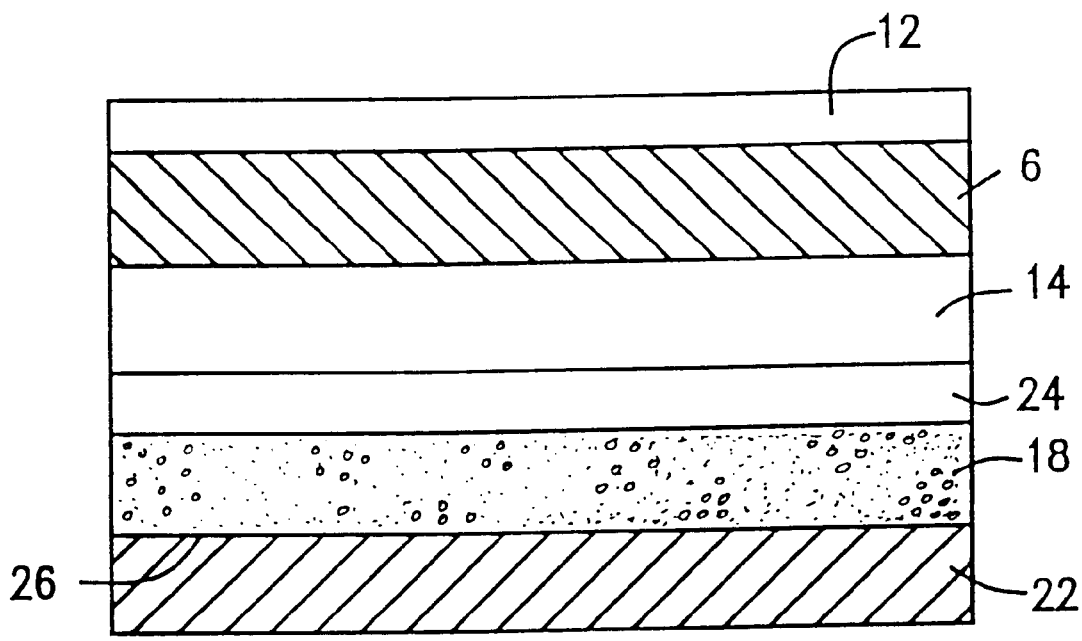
FIG. 4 is a sectional view of a preferred embodiment of the peelable label.
Figure 5:
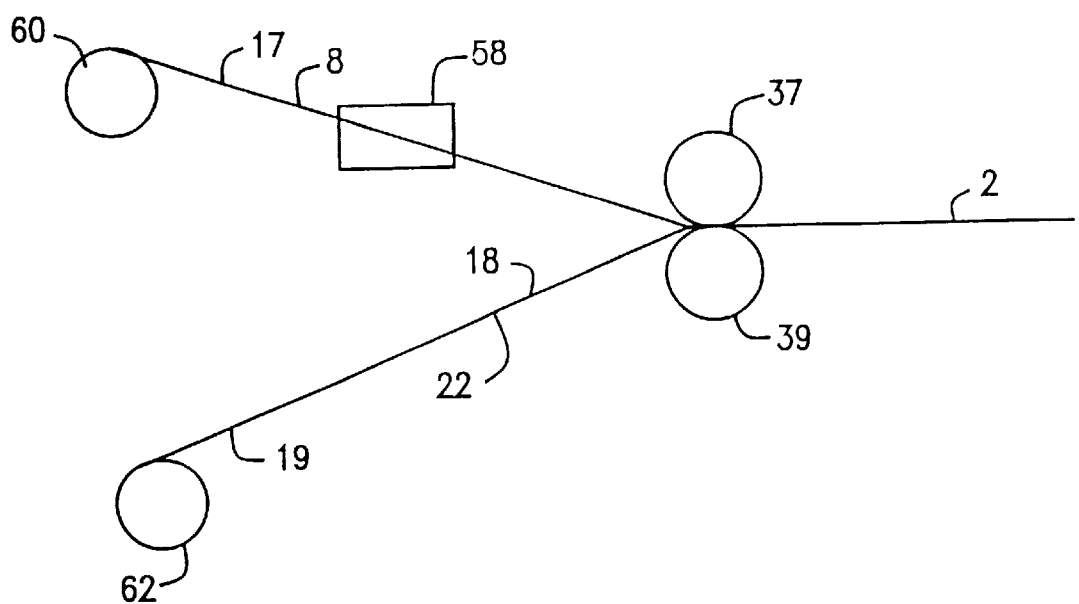
FIG. 5 is a diagrammatic view of a preferred embodiment of the method of printing indicia in registry on said label.

Now referring to FIG. 4, in a preferred embodiment primary label 4 comprises primary substrate 6, indicia 12, release layer 14 and indicia 24 disposed on release layer surface 16. Secondary label 20 comprises secondary substrate 22 and pressure sensitive adhesive 18 disposed on the front side 26 of secondary substrate 22. Now also referring to FIG. 5, in this preferred embodiment the indicia for the secondary label 20 of the present invention is disposed on the label 4 by printing label indicia 24 in reverse (random or registered) on the back side of the primary label 4 directly on the release layer 14. In this manner, upon separation of primary label 4 from secondary label 20 after lamination indicia 24 will be transferred to the pressure sensitive adhesive 18 on the surface of the secondary label 20. This embodiment of the present invention is advantageous in that indicia 12 and 24 can be printed on the primary label web 17 in one pass through a printing press 58 which may employ multiple printing stations using the front side 8 and back side 18 of the primary web 17. The indicia printed in reverse on the release layer 14 will adhere and transfer to the tacky pressure sensitive adhesive 18 when laminated. By using this technique with registered indicia to preprint the primary label, any conventional adhesive laminator can use tacky adhesive to produce registered couponable labels without special equipment to register two printed webs of paper or polymer. In addition, since the ink of indicia 24 is transferring to the surface of the tacky adhesive 18, there will not be tack in the inked areas since the tacky adhesive 18 is masked by the ink.

In this embodiment, primary label 4 can be laminated with secondary label 20 in a manner ensuring registry between printed indicia 12 and 24. Primary label 4 in the form of a web 17 is unwound from roll 60 and passed through a printing press 58 which prints indicia 12 in registry using the front side 8 and back side 18 of the primary web 17. The indicia 24 is printed in reverse on the release layer 14 so that it will adhere and transfer to the tacky pressure sensitive adhesive 18 when laminated. Secondary label substrate 20 in the form of a web 19 is unwound from a roll 62. Primary label 4 and secondary label 20 then pass simultaneously between a pair of pressure rolls 37 and 39 ensuring that the labels 4 and 20 are laminated together with indicia 12 and 24 in registry.

The back side 28 of the secondary label 20 is affixed to the object to be labeled 36 through the use of an adhesive (not shown). Die cut labels can use conventional wet labeling glue such as but not limited to Henkel BL300 for brewery applications, Aqueous adhesives or Hot Melt adhesives from Fuller, Findley, or National Starch and Chemical for wrap around labels, Morton International Aqueous 37P295 or Solvent 33P5 type Gel Lacquer heat activated adhesives or pressure sensitive adhesives such as Nacor 4990 from National Starch and Chemical Company.

The secondary label 20 with the adhered primary or face label 4 is applied to the article 36 to be labeled with greater adhesion of the secondary substrate 22 to the labeled article 36 than adhesion of the primary label 4 to the secondary label 20 so the primary or face label 4 can be removed from the secondary or base label 20 with the secondary or base label remaining adhered to the labeled article 36. The use of the release coating 14 facilitates the ease of removability (low bond strength) of the primary or face label 4 from the secondary or base label 20.

Figure 6:
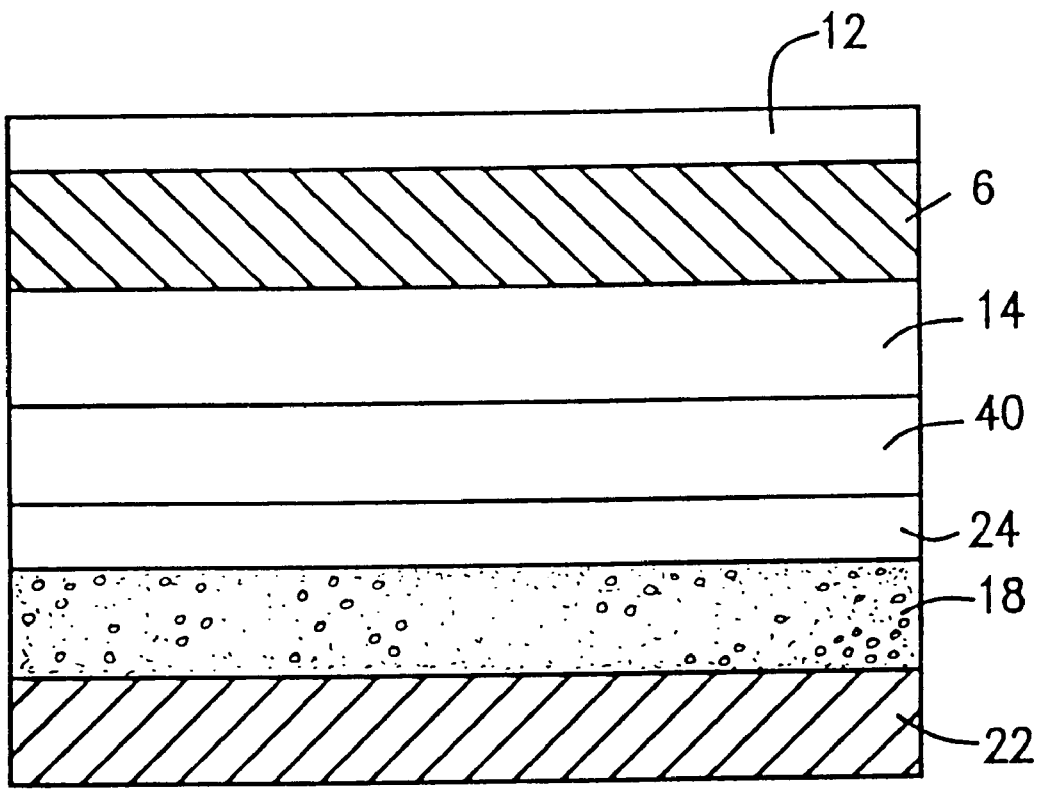
FIG. 6 is a sectional view of a most preferred embodiment of the peelable label.

Now referring to FIG. 6, in a most preferred embodiment the peelable label 2 further comprises protective layer 40 disposed between release layer 14 and pressure sensitive adhesive 18. Protective layer 40 is preferably clear or contact clear. Protective layer 40 can be any protective layer known in the art such as but not limited to Manders Flexcon Release Lacquer 82-3-92821. In this embodiment, primary label 4 comprises primary substrate 6, indicia 12, release layer 14 and indicia 24 disposed on release layer surface 16. Indicia 24 is disposed on protective layer 40. Application of protective layer 40, which may be clear or contact clear, may be made onto release layer 14 with 100% coverage or, alternatively, only in the area from which the indicia will be transferred. Protective layer 40 is typically comprised of a high cohesive strength water or solvent based polymer.

Secondary label 20 comprises secondary substrate 22 and pressure sensitive adhesive 18 disposed on the front side 26 of secondary substrate 22. Now also referring to FIG. 5, in this most preferred embodiment the lamination step is preferably carried out in the same manner as that described in the preferred embodiment and illustrated in FIG. 5. The indicia of the present invention is disposed on the labels 4 and 20 by printing label indicia 24 in reverse (random or registered) on the primary label 4 directly on the clear protective layer 40 and the indicia 24 will be transferred to the pressure sensitive adhesive 18 on the face of the base label. Protective layer 40 provides a cohesive transfer base to add integrity to the printed indicia 24 and also will mask the tack of the tacky adhesive 18 in the areas applied when the primary and secondary labels are separated during use.

In the most preferred embodiment, in use, when the primary label 4, usually a coupon, is removed from the secondary label 20, the primary label (coupon) 4 is non-tacky and the secondary label 20 retains a slight tack except in the area of indicia 24. When the protective coating coats the entire release layer 14, both the primary label (coupon) 4 and the secondary label 20 are non-tacky.

From the foregoing, it is seen that this invention is one well adapted to attain all the ends and objectives hereinabove set forth together with other advantages which are inherent in the structure. Variations of the present invention will suggest themselves to those skilled in the art in light of the above-detailed description. All such variations and modifications are within the full intended scope of the appended claims.

What is claimed is:

1. A peelable label consisting essentially of
    a primary label, having printed indicia directly on its front side;
    a release layer having a front side and a back side, said front side being disposed on the back side of said primary label, said release layer having printed indicia directly on the back side of said release layer;
    a secondary label laminated onto said release layer having directly printed indicia with a pressure sensitive adhesive layer.

2. A peelable label according to claim 1 wherein said primary label is a substrate selected from the group consisting of paper, polymer and a mixture of paper and polymer.

3. A peelable label according to claim 1 wherein said secondary label is a substrate selected from the group consisting of paper, polymer and a mixture of paper and polymer.

4. A peelable label according to claim 1 wherein the amount of pressure sensitive adhesive is minimized to the lowest coated weight possible to maintain adhesion between said primary and secondary labels.

5. A peelable label according to claim 1 wherein said pressure sensitive adhesive is a carboxylated acrylic and further comprises a crosslinking agent.

6. The peelable label according to claim 1 wherein after said primary label and said secondary label are separated the indicia disposed on said release layer is transferred to the pressure sensitive adhesive on said secondary label.

7. A peelable label according to claim 1 wherein the printed indicia on the release layer is reverse printed on said release layer.

8. A peelable label according to claim 7 wherein after said primary label and said secondary label are separated the indicia disposed in reverse on said reverse layer is transferred to the pressure sensitive adhesive on said secondary label.

9. A labeled article where the peelable label of claim 1 is affixed to an article with greater adhesion of the secondary label to the labeled article that the adhesion of the primary label to the secondary label.

10. A peelable label consisting essentially of
    a primary label, having printed indicia directly on its front side;
    a release layer having a front and a back side, said release layer being disposed on its front side to the back side of said primary label and having printed indicia directly on the side of release layer which is the back side of said release layer;
    a protective layer having a front side and a back side, said protective layer being disposed on the back side of said release layer and having directly on the back side of said protective layer, printed indicia; and
    a secondary label laminated over said directly printed indicia and said back side of said protective layer with a pressure sensitive adhesive layer.

11. A peelable label according to claim 10 wherein the protective layer is a clear polymer.

12. A peelable layer according to claim 10 wherein said protective layer covers the entire release layer.

13. A peelable layer according to claim 10 wherein said protective layer covers less than the entire release layer.

14. A peelable layer according to claim 10 wherein said protective layer covers only the area of the release layer where indica is disposed.

* * * * *